United States Patent [19]

Sharma et al.

[11] Patent Number: 5,680,553
[45] Date of Patent: Oct. 21, 1997

[54] HIGH-SPEED TRANSFER OF DATA BETWEEN A PC COMPATIBLE MICROCOMPUTER AND A BUS DEVICE

[75] Inventors: Raghu Sharma, North Oaks; Steven A. Tuckner, Lake Elmo, both of Minn.

[73] Assignee: Multi-Tech Systems, Inc., Mounds View, Minn.

[21] Appl. No.: 774,469

[22] Filed: Oct. 10, 1991

[51] Int. Cl.⁶ ............................................. G06F 3/00
[52] U.S. Cl. ............................................. 395/250
[58] Field of Search ............................ 395/650, 575, 395/250

[56] References Cited

U.S. PATENT DOCUMENTS

| | | | |
|---|---|---|---|
| 4,523,055 | 6/1985 | Hohl et al. | 179/2 |
| 4,663,777 | 5/1987 | Szeto | 379/88 |
| 4,701,845 | 10/1987 | Andreasen et al. | 395/575 |
| 4,864,601 | 9/1989 | Berry | 379/96 |
| 5,192,999 | 3/1993 | Graczyk et al. | 358/85 |

FOREIGN PATENT DOCUMENTS

| | | |
|---|---|---|
| 8313583 | 10/1983 | Australia . |
| 2025157 | 1/1990 | Japan . |

OTHER PUBLICATIONS

Copy of an abstract of JP 2025157, published Jan. 26, 1990, searched from World Patents Index.

Copy of an abstract of AU 8313583, published Oct. 27, 1983, searched from British Library through Patent Express.

Multi-Tech Systems, Inc., "The New Intelligent Serial Interface", Jan., 1991, product brochure.

Comdex, Fall 1990, Las Vegas, NV, Nov. 12–16, trade show.

Comdex, Spring 1991, Atlanta, GA, May 20–23, trade show.

TCA 1991, San Diego, CA, Sep. 24–26, trade show.

*Primary Examiner*—Parshotam S. Lall
*Attorney, Agent, or Firm*—Schwegman, Lundberg, Woessner & Kluth, P.A.

[57] ABSTRACT

A method for the high-speed transfer of data between an IBM compatible personal computer (PC) and a bus device. A DMA controller is placed on the bus device to by-pass the PC's DMA controller. High-level terminate and stay resident software on the PC uses a combination of the DMA controller on the bus device and low level DMA controller routines to transfer the data between the PC and the bus device.

2 Claims, 5 Drawing Sheets

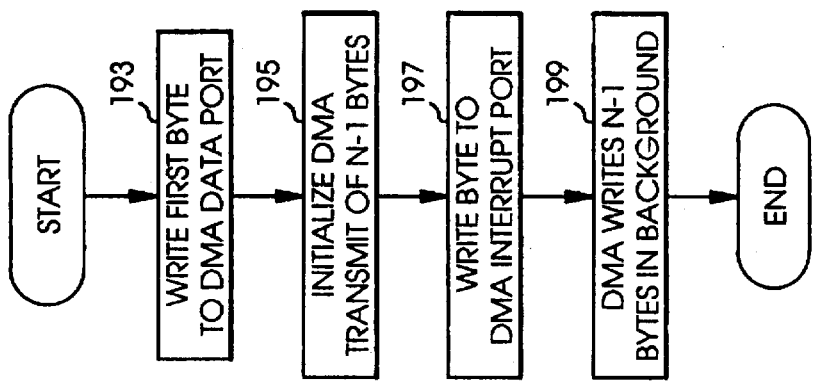
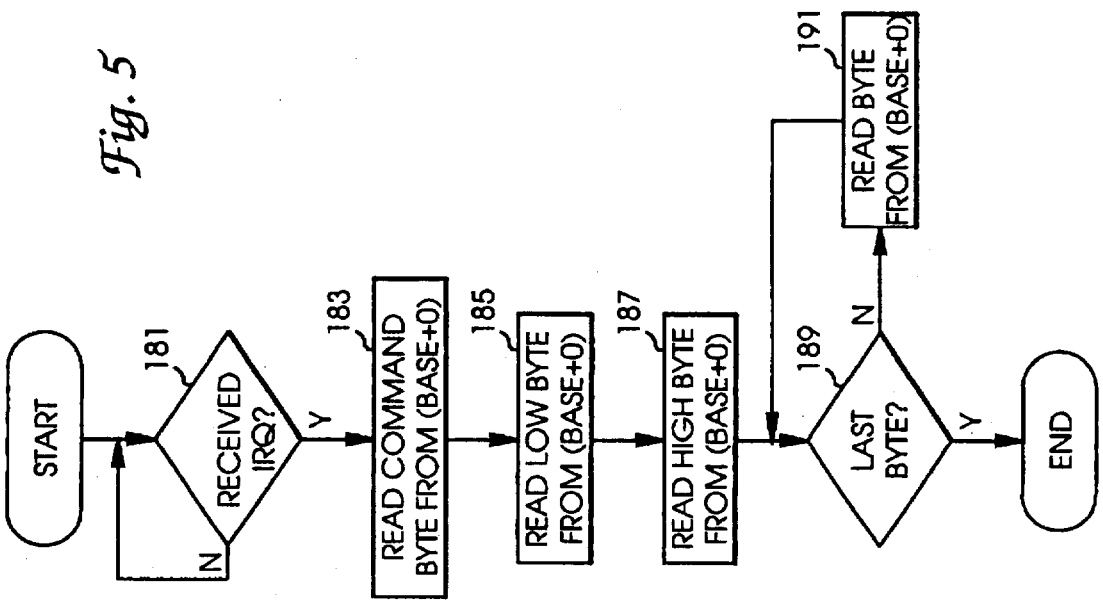

HIGH-SPEED TRANSFER OF DATA BETWEEN A PC COMPATIBLE MICROCOMPUTER AND A BUS DEVICE

FIELD OF THE INVENTION

The present invention pertains generally to data processing, and more particularly to microcomputer systems and processes for operating microcomputer systems.

BACKGROUND OF THE INVENTION

External devices such as modems are connected to IBM compatible personal computers (PCs) via a serial communication port. Data is sent from the PC internal data bus through a UART to convert it from parallel to serial, and the serial data is sent through the communication port to the modem via a serial channel controller. Internal modems usually use a similar bus interface and mimic a serial channel device in order to maintain compatibility with communication software. Thus, data sent to an internal modem is also sent through the PC's UART to convert it from parallel to serial, and the serial data is then sent through the internal modem's serial input/output controller to convert it back to parallel for use on the modem's internal data bus.

A PC is furnished with a direct memory access (DMA) controller to cope with the large amount of data that must be transferred between its component elements. The DMA controller allows data to be directly transferred across the PC's internal data bus to its RAM without the intervention of the PC's microprocessor.

However, converting parallel data to serial data and then back again to parallel data is unnecessary and slows down the speed with which data can be transferred to and from an internal modem. In addition, as the memory refresh of the PC on an industry-standard architecture (ISA) platform is handled through the DMA controller and must occur every 15.6 microseconds, and as it takes approximately 500 nanoseconds to transfer one data byte, single PC DMA data transfers are limited to approximately 28 bytes in length. For large data transfers, the data must be divided into many smaller segments before it can be transferred. This increases overhead and slows down the overall data transfer rate.

Therefore, there is a need to eliminate the extra data conversion step and provide a faster way to transfer data between a PC and an internal modem. There is a further need to provide for efficient data transfers that are not limited to 28 bytes in length.

SUMMARY OF THE INVENTION

The present invention provides a method for the high-speed transfer of data between an IBM compatible personal computer (PC) and a bus device. A DMA controller is placed on the bus device to by-pass the PC's DMA controller. High-level terminate and stay resident (TSR) software on the PC uses a combination of the DMA controller on the bus device and low level DMA controller routines to transfer the data between the PC and the bus device.

The method for the high-speed transfer of data maintains compatibility with existing data transfer methods and requires only a small TSR program on the PC to take advantage of the high-speed data transfer capability. A system implemented according to the present invention demonstrates a noticeable increase in the speed with which data can be transferred between a PC and a bus device than systems implemented under previous methods.

BRIEF DESCRIPTION OF THE DRAWINGS

FIG. 5 is a flow diagram showing the steps the PC takes to read data from the modem according to the present invention.

FIG. 6 is a flow diagram showing the steps the modem takes to write data to the PC according to the present invention.

DETAILED DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
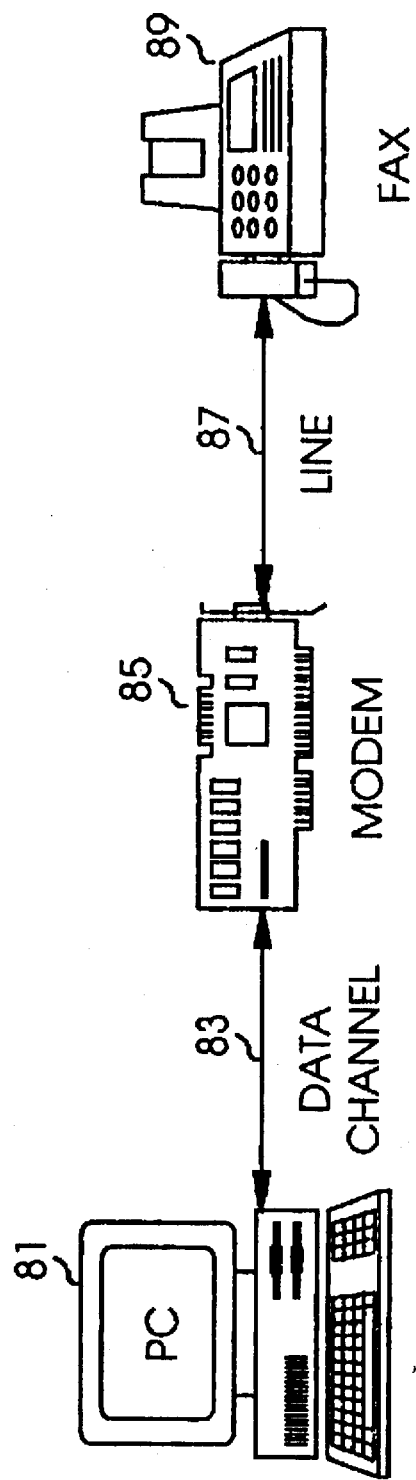
FIG. 1 is a diagram showing the connection between a PC and a Data Terminal Equipment (DTE) device according to the present invention.

The connection between a DTE device such as a FAX machine through a plug-in modem to a PC is shown in FIG. 1. A PC 81 contains a plug-in modem 85 which includes a data channel 83 between the modem and the PC. The plug-in modem 85 also provides a telephone line interface to connect to a DTE device 89 through telephone line 87.

Figure 2:
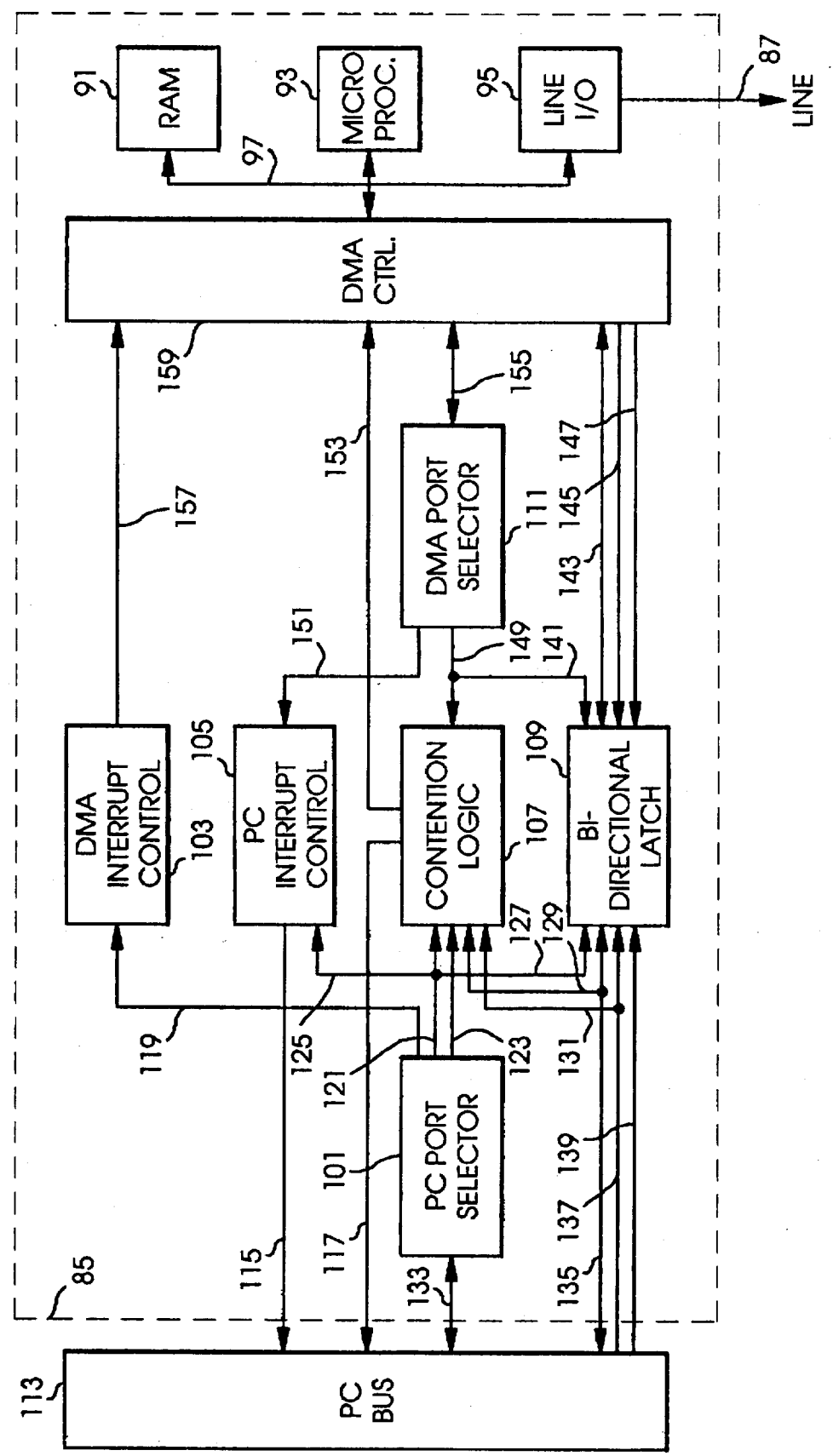
FIG. 2 is a block diagram showing the high-level architecture of the bus interface according to the present invention.

The high-level architecture of the bus interface between the PC bus and the DMA controller is illustrated in FIG. 2. The PC port selector 101 selects which PC port to read or write via address line 133 to PC bus 113. When data is sent to the modem, the PC port selector 101 sends an interrupt request via line 119 to the DMA interrupt control 103 which sends it to DMA controller 159 via line 157. The DMA controller 159 then interrupts microprocessor 93 via the internal data bus 97. The PC port selector 101 uses line 121 to send a read or write request to contention logic 107, to clear a PC interrupt via line 125 to the PC interrupt control 105, and to request a byte transfer via line 127 to the bi-directional latch 109. PC status is read by the contention logic 107 via line 123 from the PC port selector 101.

The DMA port selector 111 selects which DMA port to read or write via address line 155 to the DMA controller 159. When data is sent to the PC, the DMA port selector 111 sends an interrupt request via line 151 to the PC interrupt control 105 which interrupts the PC bus 113 via line 115. The DMA port selector 111 uses line 149 to send a read or write request to contention logic 107 and to request a byte transfer via line 141 to the bi-directional latch 109.

The contention logic 107 mediates between the PC and the modem when either has data to be sent by sending an I/O request wait to either the PC bus 113 via line 117, or to the DMA controller 159 via line 153. The contention logic 107 uses line 129 to access the PC data bus 135, and uses line 131 to access the PC read line 137.

The bi-directional latch 109 is under control of the PC port selector 101 and DMA port selector 111, and acts as a gateway for the data passing between the PC bus 113 and the DMA controller 159. The bi-directional latch 111 connects to the PC bus 113 via data bus 135, read line 137, and write line 139, and connects to the DMA controller 159 via data bus 143, read line 145, and write line 147.

The DMA controller 159 places data in random access memory (RAM) 91 via internal data bus 97. Data can then be accessed by microprocessor 93 and transferred to or from line 87 via telephone line interface 95.

Figure 3:
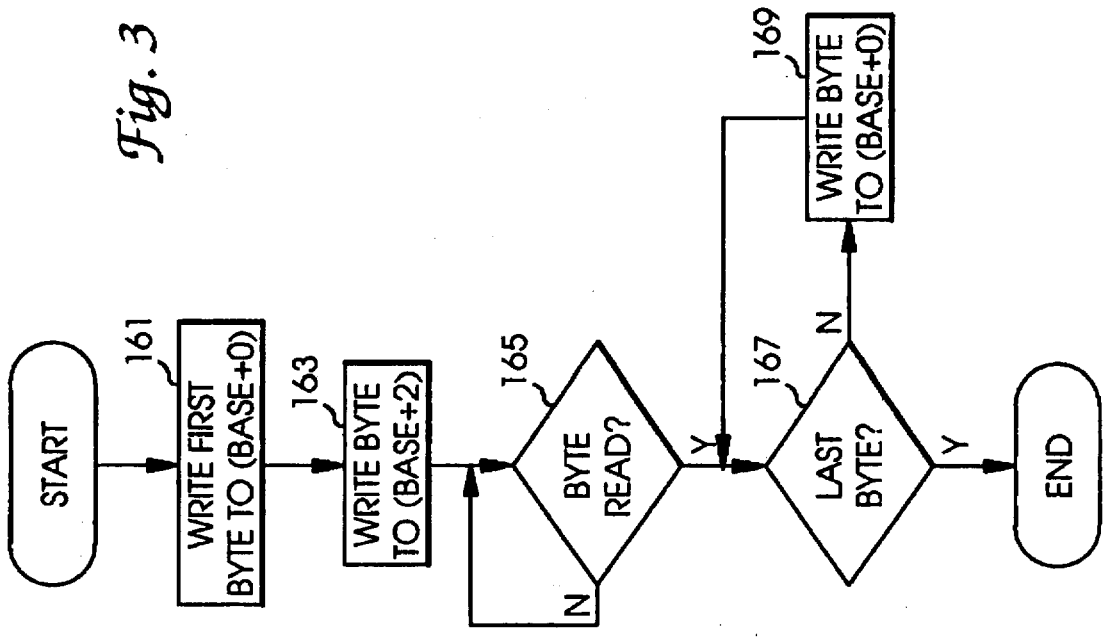
FIG. 3 is a flow diagram showing the steps the PC takes to write data to the modem according to the present invention.

The method the PC uses to write data to the DMA controller is shown in FIG. 3. At 161 the PC writes the first data byte to the modem base I/O address +0, and at 163 an arbitrary byte is written to the base address +2 in order to interrupt the microprocessor with the DMA controller. The PC waits at 165 until the first byte has been read, then checks at 167 to see if there is another byte to write. If there is another byte to write, at 169 the PC writes the byte to base address +0.

Figure 4:
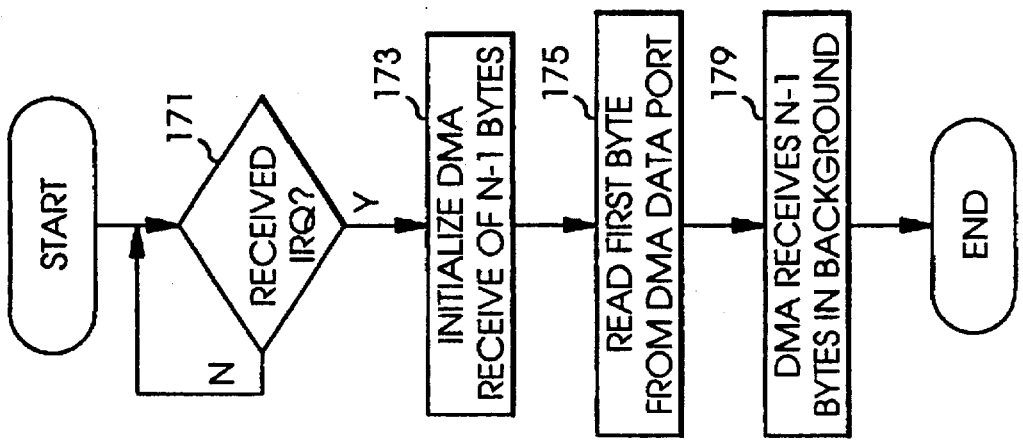
FIG. 4 is a flow diagram showing the steps the modem takes to read data from the PC according to the present invention.

The method the modem uses to read data from the PC is revealed in FIG. 4. At 171 the microprocessor waits for an interrupt from the PC. Once an interrupt is received, the DMA controller is initialized at 173 for a read of N−1 bytes, the first data byte is read at 175 from the DMA data port, and the DMA controller reads the remaining bytes at 179.

The method the PC uses to read data from the modem is described in FIG. 5. At 181 the PC waits for an interrupt from the DMA controller. Once an interrupt is received, the command byte is read at 183 from the base address +0, the low byte of the data count is read at 185, and the high byte of the data count is read at 187. At 189 the PC checks to see if there is another byte to read. If there is another byte to read, at 191 the PC reads the byte from base address +0.

The method the modem uses to write data to the PC is illustrated in FIG. 6. At 193 the DMA controller writes the first byte to the DMA data port, at 195 initializes a DMA controller write of N−1 bytes, at 197 writes an arbitrary byte to the DMA interrupt port, and at 199 the DMA controller writes the remaining bytes.

Figure 7:
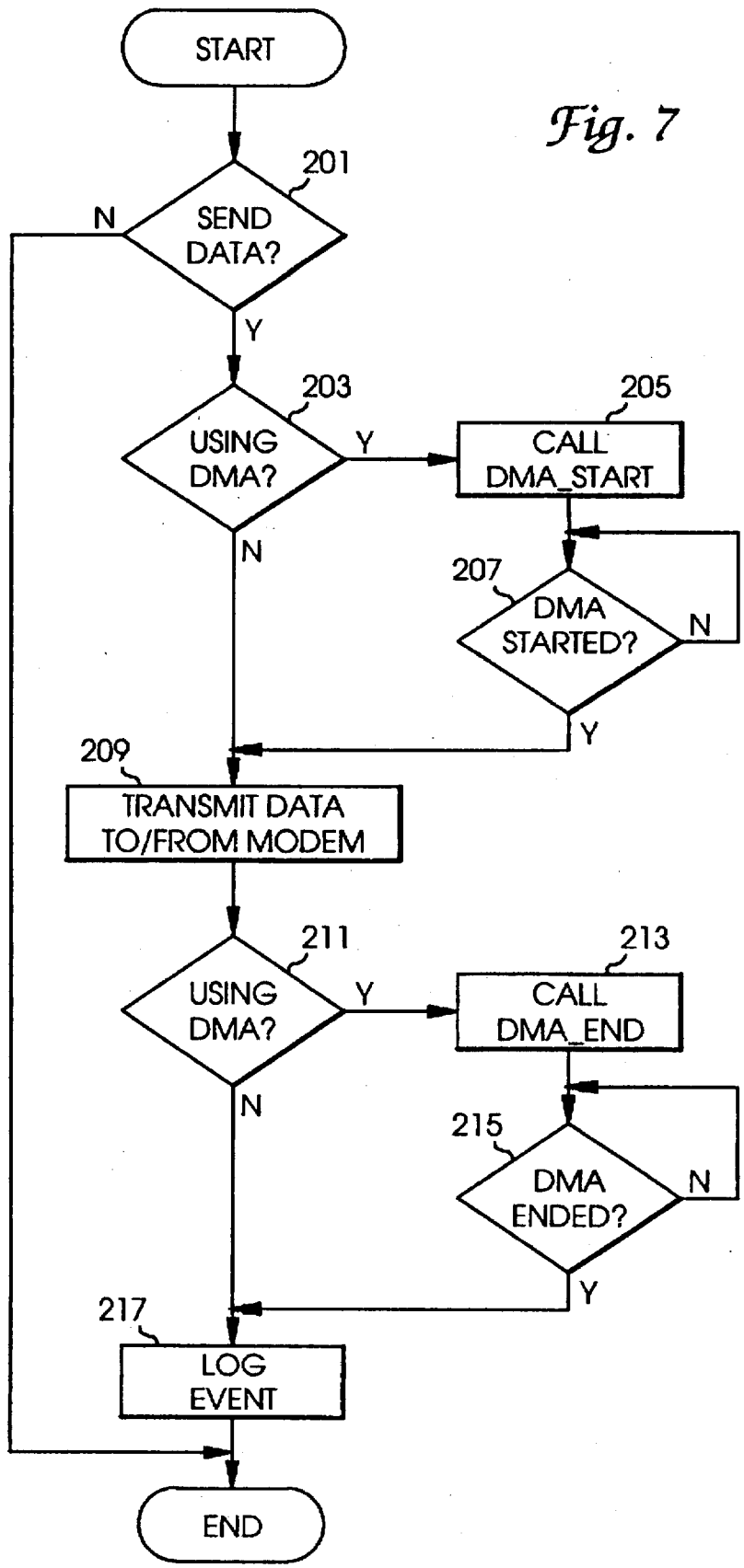
FIG. 7 is a flow diagram showing the high-level steps the PC TSR program takes to write data to the modem according to the present invention.

The method the PC TSR program uses to write data to and read data from the modem is shown in FIG. 7. At 201 the PC checks to see if there is data to transfer. If there is no data to transfer, it exits. If there is data to transfer, the PC checks at 203 to see if a DMA is being used. If a DMA is being used, a DMA_START command is sent at 205 and the PC waits at 207 until the DMA starts. At 209 the data to be transferred is sent or received, and at 211 the PC once again checks to see if a DMA is being used. If a DMA is being used, a DMA_END command is sent at 213 and the PC waits at 215 until the DMA ends. The data transfer is then logged at 217.

Communication to the modem from the high level PC software is accomplished by calling the low-level routines described in FIGS. 3 though 6. Because the modem has both a UART and a high speed DMA port, either can be used to pass data back and forth between the PC and the modem. The UART and DMA port share the same interrupt line, so only one can be active at a time. Thus, the high-level routine described in FIG. 7 must start the DMA by switching the interrupt line for DMA usage before the data is transferred, buffer the data while it is being transferred, and must end the DMA after the data is transferred. The interrupt line normally defaults to UART usage to maintain compatibility with other vendor's communication programs.

It is to be understood, however, that even though numerous characteristics and advantages of the invention have been set forth in the foregoing description, together with details of the structure and function of the invention, the disclosure is illustrative only, and changes may be made in detail, especially in matters of shape, size, and arrangement of parts within the principles of the invention, to the full extent indicated by the broad general meaning of the terms in which the appended claims are expressed.

What is claimed is:

1. A method for a high-speed transfer of data from an IBM compatible PC to a bus device, wherein the bus device is a modem plug-in device having a device memory and a Direct Memory Access (DMA) controller for transferring data between the device memory and the PC, the device having a first device data port for transferring data in serial form to and from a PC UART and a second device data port for transferring data in parallel form to and from a device I/O channel, the first and second ports sharing a common interrupt port, the method comprising the steps of:

(a) setting the interrupt port to a default setting, wherein its services interrupts associated with transferring data to and from a PC UART through the first device data port;

(b) in response to a request from a PC process, switching the interrupt port to service interrupts associated with transferring data in parallel form through the second device data port;

(c) the PC process writing a first data byte to be transferred to the device base I/O address +0 to present the data to the second device data port;

(d) the PC process writing a byte to the device base I/O address +2 to interrupt the device through the device interrupt port;

(e) the PC process reading a byte to the device base I/O address +1 to determine if the first data byte has been read by the device;

(f) the device waiting for an interrupt from the PC;

(g) the device initializing a DMA read of n bytes, where n is an integer;

(h) the device DMA controller reading the first data byte from the second device data port and placing the byte in the device memory;

(i) the PC writing n bytes to the device base I/O address +0;

(j) the device DMA controller receiving n bytes through the second device data port as they are sent from the PC and placing the received bytes in device memory; and (k) wherein the PC process is directed by a terminate and stay resident program executing in the PC.

2. A method according to claim 1 further comprising the steps of:

(a) the device writing a command byte to the second device data port;

(b) the device initializing the DMA controller to accomplish a DMA write of n bytes from the device memory to the PC;

(c) the device writing a byte to the interrupt port to interrupt the PC;

(d) the PC process waiting for the interrupt from the device;

(e) the PC process reading the command byte;

(f) the device DMA controller writing n bytes to the second device data port to present the bytes to the device base I/O address +4.

* * * * *